United States Patent
Erel et al.

(10) Patent No.: US 10,324,843 B1
(45) Date of Patent: *Jun. 18, 2019

(54) SYSTEM AND METHOD FOR CACHE MANAGEMENT

(71) Applicant: EMC Corporation, Hopkinton, MA (US)

(72) Inventors: David Erel, Shoham (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/164,520

(22) Filed: May 25, 2016

Related U.S. Application Data (63) Continuation of application No. 13/539,419, filed on Jun. 30, 2012, now Pat. No. 9,378,096.

(51) Int. Cl.
*G06F 12/00* (2006.01)
*G06F 12/0808* (2016.01)
*G06F 12/0815* (2016.01)

(52) U.S. Cl.
CPC ...... *G06F 12/0808* (2013.01); *G06F 12/0815* (2013.01); *G06F 2212/1032* (2013.01); *G06F 2212/281* (2013.01)

(58) Field of Classification Search
None
See application file for complete search history.

(56) References Cited

U.S. PATENT DOCUMENTS

| | | | | |
|---|---|---|---|---|
| 5,644,701 A | * | 7/1997 | Takewaki | G06F 11/1407 711/144 |
| 5,860,083 A | | 1/1999 | Sukegawa | |
| 7,467,268 B2 | * | 12/2008 | Lindemann | G06F 11/1469 711/113 |
| 7,784,098 B1 | | 8/2010 | Fan et al. | |
| 8,627,012 B1 | | 1/2014 | Derbeko et al. | |
| 9,009,416 B1 | | 4/2015 | Derbeko et al. | |
| 9,104,529 B1 | | 8/2015 | Derbeko et al. | |
| 9,235,524 B1 | | 1/2016 | Derbeko et al. | |
| 9,317,375 B1 | * | 4/2016 | Sadhu | G06F 11/1451 |
| 2005/0138289 A1 | * | 6/2005 | Royer, Jr. | G06F 12/0866 711/118 |
| 2005/0235016 A1 | | 10/2005 | Amano et al. | |
| 2008/0098041 A1 | * | 4/2008 | Chidambaran | G06F 17/3056 |
| 2008/0098173 A1 | | 4/2008 | Chidambaran et al. | |
| 2008/0222373 A1 | | 9/2008 | Garimella | |
| 2009/0193064 A1 | * | 7/2009 | Chen | G06F 17/30315 |
| 2009/0300080 A1 | | 12/2009 | Stringham | |
| 2010/0306172 A1 | | 12/2010 | Gopalakrishnan | |
| 2012/0078856 A1 | | 3/2012 | Linde | |

* cited by examiner

*Primary Examiner* — Prasith Thammavong
(74) *Attorney, Agent, or Firm* — Krishnendu Gupta; Lesley Leonessa (57) ABSTRACT

A method, computer program product, and computing system for receiving an indication of an intent to restore at least a portion of a data array based upon a historical record of the data array. One or more changes made to the content of that data array after the generation of the historical record may be identified, thus generating a differential record. One or more data entries within a cache memory system associated with the at least a portion of a data array may be invalidated based, at least in part, upon the differential record.

20 Claims, 4 Drawing Sheets

SYSTEM AND METHOD FOR CACHE MANAGEMENT

CROSS-REFERENCE PARAGRAPH

The subject application is a continuation of U.S. patent application Ser. No. 13/539,419, filed on Jun. 30, 2012. The entire content of the application is herein incorporated by reference.

TECHNICAL FIELD

This disclosure relates to cache memory systems and, more particularly, to systems and methods for managing the content of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes receiving an indication of an intent to restore at least a portion of a data array based upon a historical record of the data array. One or more changes made to the content of that data array after the generation of the historical record may be identified, thus generating a differential record. One or more data entries within a cache memory system associated with the at least a portion of a data array may be invalidated based, at least in part, upon the differential record.

One or more of the following features may be included. The cache memory system may be a flash-based cache memory system. The at least a portion of a data array may be a LUN defined within the data array. The differential record may include one or more bitmaps. The one or more changes made to the content of that data array after the generation of the historical record may be the result of IO requests processed after the generation of the historical record. The IO requests processed may include missed IO read requests and IO write requests. The historical record may be an array snapshot.

In another implementation, a computer program product resides on a computer readable medium that has a plurality of instructions stored on it. When executed by a processor, the instructions cause the processor to perform operations including includes receiving an indication of an intent to restore at least a portion of a data array based upon a historical record of the data array. One or more changes made to the content of that data array after the generation of the historical record may be identified, thus generating a differential record. One or more data entries within a cache memory system associated with the at least a portion of a data array may be invalidated based, at least in part, upon the differential record.

One or more of the following features may be included. The cache memory system may be a flash-based cache memory system. The at least a portion of a data array may be a LUN defined within the data array. The differential record may include one or more bitmaps. The one or more changes made to the content of that data array after the generation of the historical record may be the result of IO requests processed after the generation of the historical record. The IO requests processed may include missed IO read requests and IO write requests. The historical record may be an array snapshot.

In another implementation, a computing system includes at least one processor and at least one memory architecture coupled with the at least one processor, wherein the computing system is configured to perform operations including includes receiving an indication of an intent to restore at least a portion of a data array based upon a historical record of the data array. One or more changes made to the content of that data array after the generation of the historical record may be identified, thus generating a differential record. One or more data entries within a cache memory system associated with the at least a portion of a data array may be invalidated based, at least in part, upon the differential record.

One or more of the following features may be included. The cache memory system may be a flash-based cache memory system. The at least a portion of a data array may be a LUN defined within the data array. The differential record may include one or more bitmaps. The one or more changes made to the content of that data array after the generation of the historical record may be the result of IO requests processed after the generation of the historical record. The IO requests processed may include missed IO read requests and IO write requests. The historical record may be an array snapshot.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
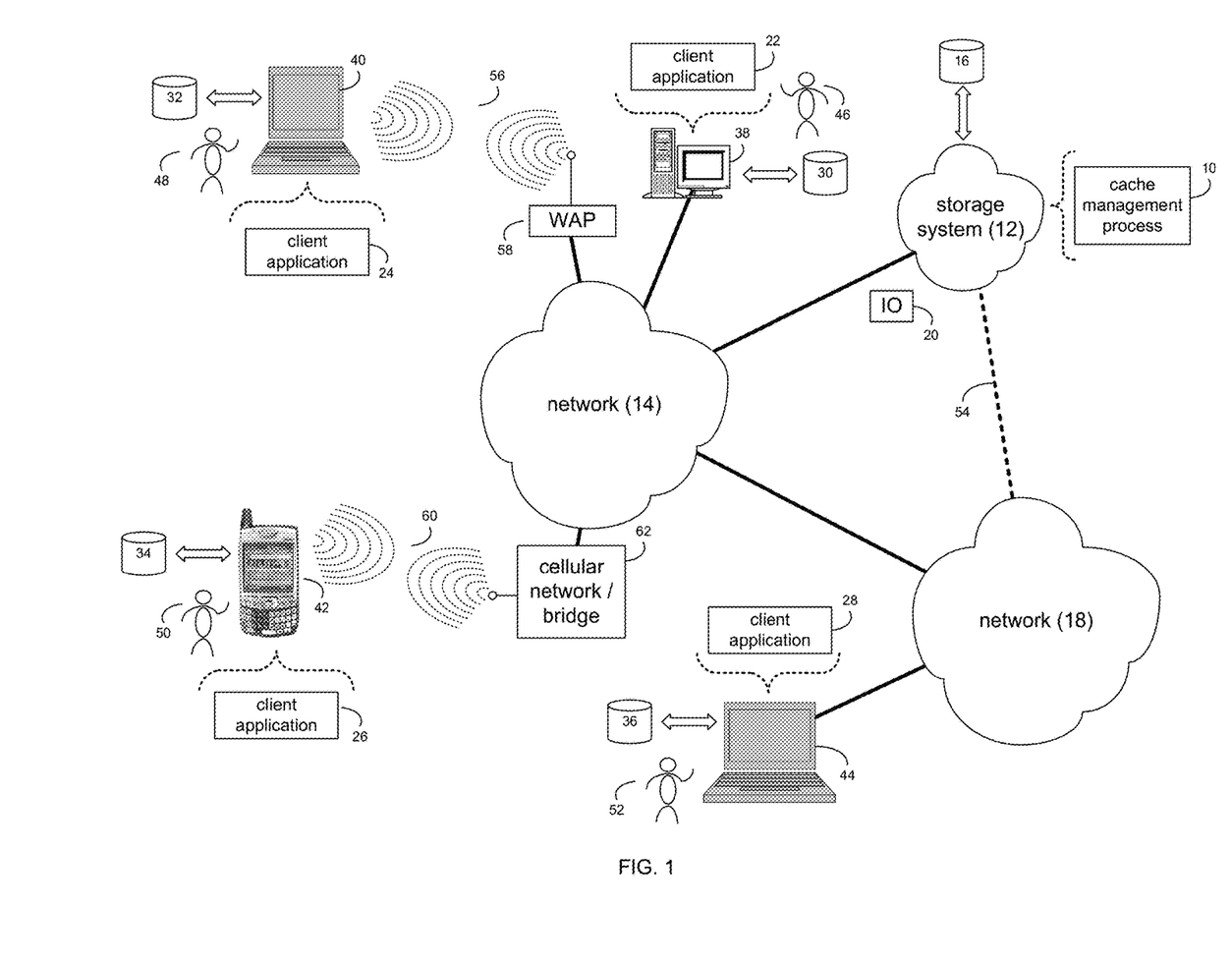
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to IO write requests (i.e. a request that content be written to storage system 12) and IO read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
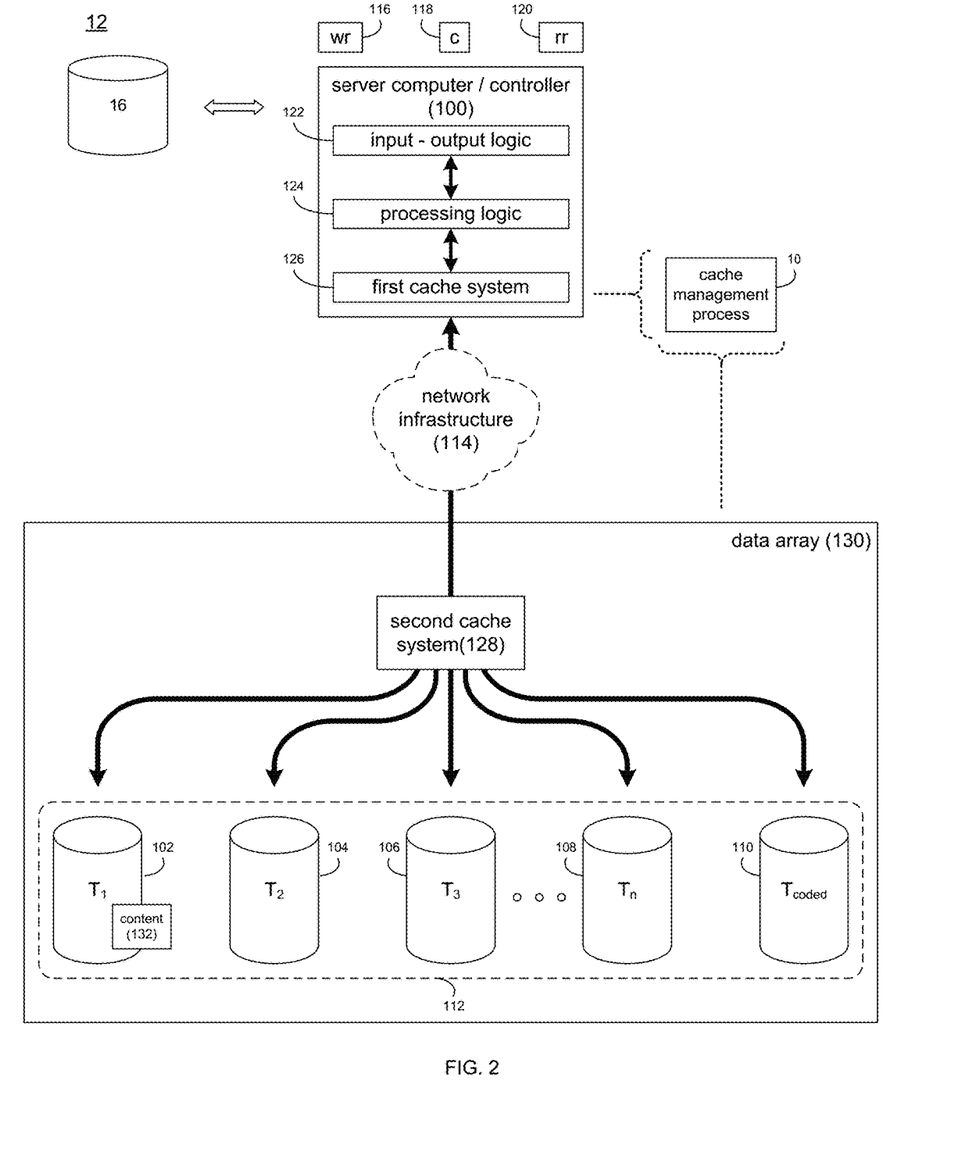
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to IO write request 116 (i.e. a request that content 118 be written to storage system 12) and IO read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 130.

Figure 3:
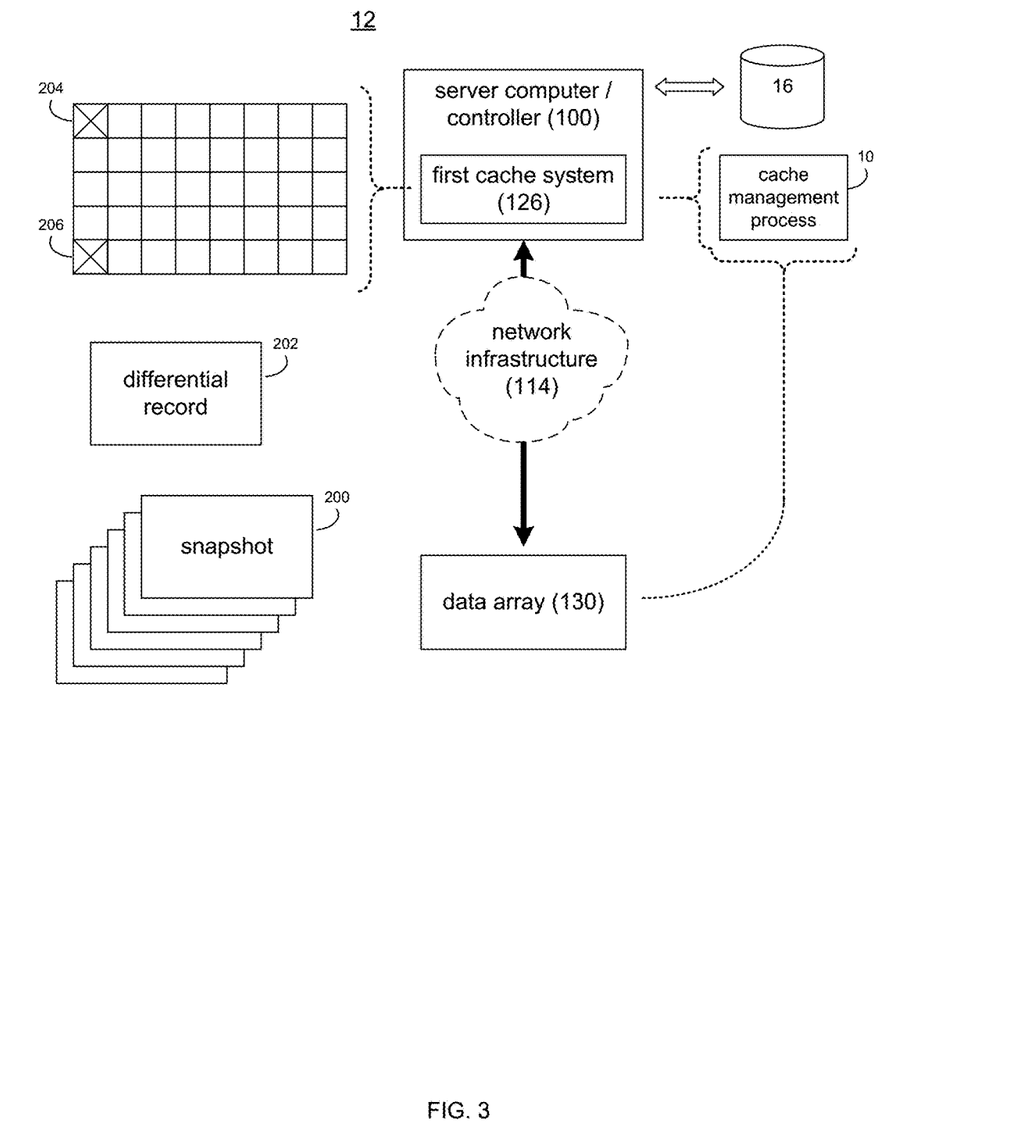
FIG. 3 is another diagrammatic view the storage system of FIG. 1.
Figure 4:
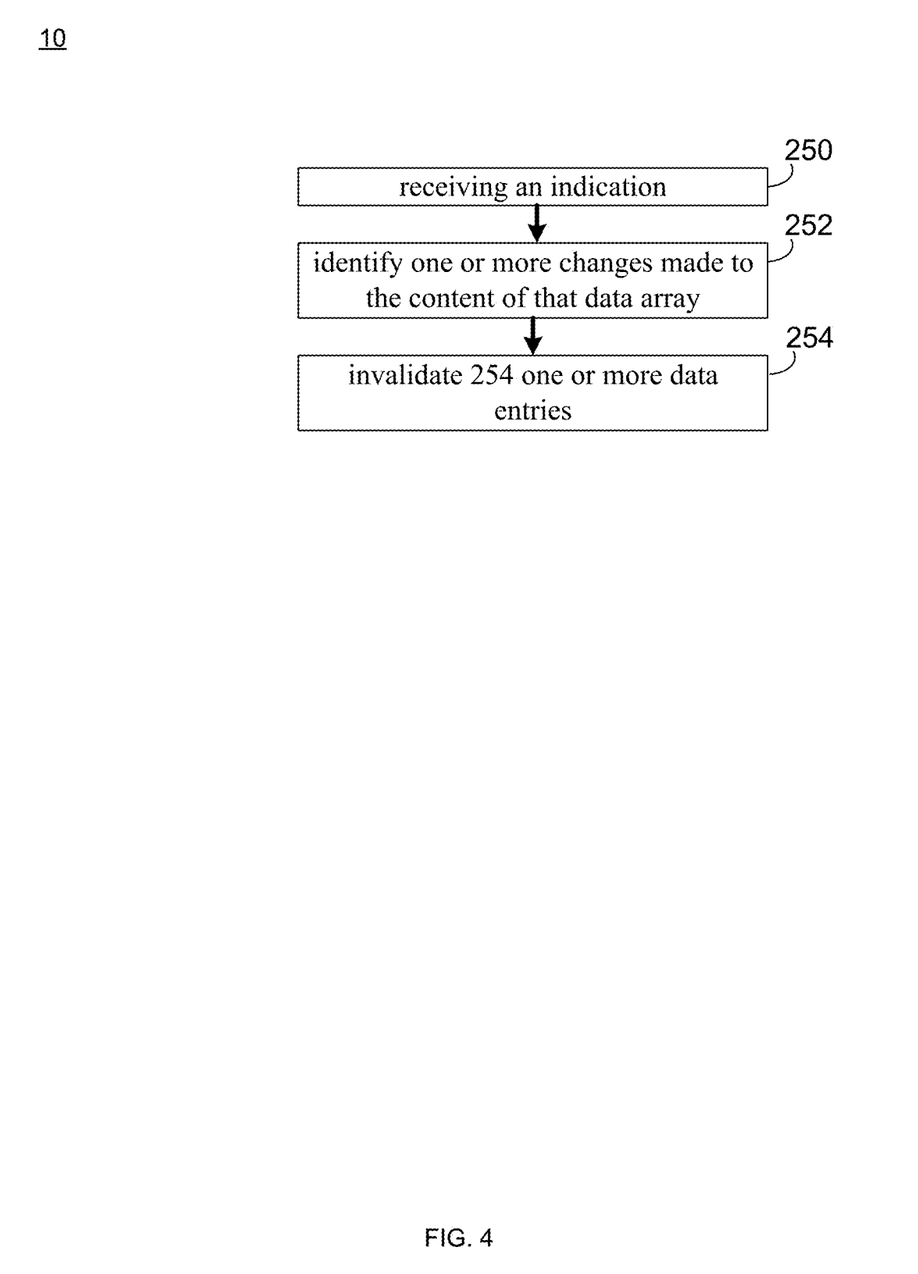
FIG. 4 is a flow chart of the cache management process of FIG. 1.

The Cache Management Process:

Referring also to FIGS. 3-4, data array 130 may be configured to generate one or more historical records (e.g., historical records 200) of the content of data array 130 at various points in time. An example of such an historical record is a snapshot that is indicative of the content of data array 130.

Typically, these historical records are differential in nature, in that they show the difference between the data state that the historical record is identifying and the last known data state. For example, if a first historical record indicated that five data files/blocks were stored within data array 130 and, prior to the generation of the next historical record, three more data files/blocks were added to data array 130, the next historical record generated for data array 130 would indicate the addition of the three added data files/blocks (i.e., the difference), as opposed to the presence of eight data files/blocks.

Assume for illustrative purposes that user 46 is an administrator of storage system 12 (and data array 130). Further assume that user 46 configures storage system 12 so that an historical record is generated every week for data array 130. Accordingly, fifty-two historical records (e.g. historical records 200) may be generated per year with respect to data array 130. Accordingly and through the use of such historical records, in the event that user 46 wishes to revert data array 130 to a previous data state, user 46 may restore data array 130 based upon the appropriate historical record. Typically, these historical records are made quite frequently (e.g., every three hours) and are kept for a short period of time (e.g., only three days), thus resulting in an inventory of approximately seventy-two historical records.

Unfortunately, in the event that user 46 does indeed restore data array 130 to a previous state, the content of first cache system 126 will no longer match the content of data array 130. As discussed above, examples of IO request 20 may include but are not limited to IO write request 116 (i.e. a request that content 118 be written to storage system 12) and IO read request 120 (i.e. a request that content 118 be read from storage system 12). In the event that first cache system 126 receives a write request (e.g. IO write request 116), the content (e.g. content 118) associated with IO write request 116 will be written to both first cache system 126 and data array 130. Further, upon first cache system 126 receiving a read request (e.g. IO read request 120), first cache system 126 will try to obtain the requested content from first cache system 126. In the event that such content is available within first cache system 126 (a "hit" IO read request), the requested content will be provided from first cache system 126 to the requesting host (e.g., server computer/controller 100). Conversely, in the event that such content is not available from first cache system 126 (a "missed" IO read request), the requested content will be obtained from data array 130, written to first cache system 126 and provided to the requesting host (e.g., server computer/controller 100). Accordingly, "missed" IO read requests and IO write requests both result in the modification of the data included within first cache system 126, while "hit" IO read requests do not result in the modification of the data included within first cache system 126.

Assume for illustrative purposes that a LUN (i.e., logical unit number) was created from a portion of data array 130 and assigned to user 48. As is known in the art, a LUN is a logical storage device that is formed using a portion of one or more physical storage devices (such as the physical storage devices included within data array 130). Assume for illustrative purposes that user 48 inadvertently and unintentionally overwrites a portion of their LUN, resulting in the unintentional corruption of content. User 48 may contact user 46 (the administrator of data array 130) to request that the deleted content be restored. Accordingly, user 46 may restore the appropriate portion of data array 130 (i.e., the LUN of user 48) to the data state prior to the content deletion using the appropriate historical record (chosen from historical records 200).

Cache management process 10 may receive 250 an indication of the intent of user 46 to restore this portion of data array 130 (i.e., the LUN of user 48) based upon a historical record of data array 130. Upon receiving 250 such an indication, cache management process 10 may identify 252 one or more changes made to the content of data array 130 after the generation of the historical record being utilized for the restoration, thus generating differential record 202. Examples differential record 202 may include one or more bitmaps. For example and as discussed above, data array 130 may maintain a plurality of historical records (e.g., historical records 200) that define the state of the data content within data array 130 at various points in time (e.g., every week).

Accordingly, through the use of such historical records (in combination with the current data state of data array 130), differential record 202 may be generated. For example, assume that each historical record is a bitmap. As is known in the art, a bitmap may be used to define historical changes of a data structure. For example, assume that the LUN of user 48 is a sixty-four megabyte LUN. Further assume that the historical records (i.e., bitmaps) used to define the LUN have a granularity of sixty-four kilobytes. Accordingly, a 1,024 bit bitmap may map the LUN of user 48 in sixty-four kilobyte increments. Accordingly, if the entire bitmap is a string of binary zeros, this is indicative of nothing changing within the LUN of user 48 since the last historical record. However, if the entire bitmap is a string of binary ones, this is indicative of everything changing within the LUN of user 48 since the last historical record. Assume that the only event that occurred with respect to the LUN of user 48 since the generation of the latest historical record was the accidental deletion of six data files that were stored within two sixty-four kilobyte portions of the LUN. Accordingly, the bitmap would be essentially all binary zeros with the exception of two binary ones that correspond to the two sixty-four kilobyte portions of the LUN that initially stored the content accidently deleted by user 48. Accordingly, the differential record generated (namely differential record 202) would show that once data array 130 is restored to the state defined by the historical record used for the restoration (thus restoring the content accidentally deleted by user 48), the mismatch between first cache system 126 and data array 130 would be limited to only two sixty-four kilobyte portions.

Accordingly, cache management process 10 may invalidate 254 one or more data entries (those corresponding to these two sixty-four kilobyte portions defined within differential record 202) within first cache memory system 126, which is associated with a portion of data array 130 (namely the LUN of user 48). This invalidation 254 by cache management process 10 may be based, at least in part, upon differential record 202. Specifically, cache management process 10 may delete two data entries (data entries 204, 206) within first cache system 126, as data entries 204, 206, are associated within the portion of data array 130 that changed subsequent to the generation of the historical record upon which the restoration of data array 130 was based. Therefore, by invalidating data entries 204, 206 within first cache system 126, there will be no mismatch between first cache system 126 and data array 130. Additionally, the majority of first cache system 126 is still intact and usable with respect to data array 130, thus reducing cache warming time.

While the system is described above as being utilized with physical machines, this is for illustrative purposes only and is not intended to be a limitation of this disclosure, as other configurations are possible. For example, cache management process 10 may be equally utilized with virtual machines operating within a virtual computing environment.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving an indication of an intent to restore at least a portion of a data array to a previous data state based upon a historical record of the data array;
identifying one or more changes made to the content of that data array after the generation of the historical record, thus generating a differential record, wherein the change to the at least a portion of a data array further indicates a mismatch between a local cache system and the data array after restoration to the previous data state; and
invalidating one or more data entries indicated in the differential record from within a cache memory system associated with the at least a portion of a data array, wherein the cache memory system is operatively connected to the local cache system via a network.

2. The computer-implemented method of claim 1 wherein invalidating the one or more data entries within the cache memory system further eliminates the mismatch between the local cache system and the data array after restoration to the previous data state.

3. The computer-implemented method of claim 2 wherein eliminating the mismatch between the local cache system and the data array reduces a period of time associated with a cache warming after restoration to the previous data state.

4. The computer-implemented method of claim 1 wherein the at least a portion of a data array is a logical unit number ("LUN") defined within the data array.

5. The computer-implemented method of claim 1 wherein the one or more changes made to the content of that data array after the generation of the historical record were the result of input/output ("IO") requests processed after the generation of the historical record.

6. The computer-implemented method of claim 5 wherein the IO requests processed include missed IO read requests and IO write requests.

7. The computer-implemented method of claim 1 wherein the historical record is an array snapshot.

8. A computer program product residing on a non-transitory computer readable medium having a plurality of instructions stored thereon which, when executed by a processor, cause the processor to perform operations comprising:
receiving an indication of an intent to restore at least a portion of a data array to a previous data state based upon a historical record of the data array;
identifying one or more changes made to the content of that data array after the generation of the historical record, thus generating a differential record, wherein the change to the at least a portion of a data array further indicates a mismatch between a local cache system and the data array after restoration to the previous data state;
invalidating one or more data entries indicated in the differential record from within a cache memory system associated with the at least a portion of a data array, wherein the cache memory system is operatively connected to the local cache system via a network.

9. The computer program product of claim 8 wherein invalidating the one or more data entries within the cache memory further eliminates the mismatch between the local cache system and the data array after restoration to the previous data state.

10. The computer program product of claim 9 wherein eliminating the mismatch between the local cache system and the data array reduces a period of time associated with a cache warming after restoration to the previous data state.

11. The computer program product of claim 8 wherein the at least a portion of a data array is a logical unit number ("LUN") defined within the data array.

12. The computer program product of claim 8 wherein the one or more changes made to the content of that data array after the generation of the historical record were the result of input/output ("IO") requests processed after the generation of the historical record.

13. The computer program product of claim 12 wherein the IO requests processed include missed IO read requests and IO write requests.

14. The computer program product of claim 8 wherein historical record is an array snapshot.

15. A computing system comprising:
at least one processor device; and
at least one memory architecture coupled with the at least one processor device;
a first software module executable by the at least one processor device and the at least one memory architecture, wherein the first software module is configured to receive an indication of an intent to restore at least a portion of a data array to a previous data state based upon a historical record of the data array;
a second software module executable by the at least one processor device and the at least one memory architecture, wherein the second software module is configured to identify one or more changes made to the content of that data array after the generation of the historical record, thus generating a differential record, wherein the change to the at least a portion of a data array further indicates a mismatch between a local cache system and the data array after restoration to the previous data state;
a third software module executable by the at least one processor device and the at least one memory architecture, wherein the third software module is configured to invalidate one or more data entries indicated in the differential record from within a cache memory system associated with the at least a portion of a data array, wherein the cache memory system is operatively connected to the local cache system via a network.

16. The computing system of claim 15 wherein invalidating the one or more data entries within the cache memory further eliminates the mismatch between the local cache system and the data array after restoration to the previous data state.

17. The computing system of claim 16 wherein eliminating the mismatch between the local cache system and the data array reduces a period of time associated with a cache warming after restoration to the previous data state.

18. The computing system of claim 15 wherein the at least a portion of a data array is a logical unit number ("LUN") defined within the data array.

19. The computing system of claim 15 wherein the one or more changes made to the content of that data array after the generation of the historical record were the result of input/output ("IO") requests processed after the generation of the historical record.

20. The computing system of claim 19 wherein the IO requests processed include missed IO read requests and IO write requests.

* * * * *